United States Patent [19]
Mori et al.

[11] Patent Number: 5,921,618
[45] Date of Patent: Jul. 13, 1999

[54] LOWER BODY STRUCTURE FOR VEHICLE

[75] Inventors: Takeo Mori; Shinji Kasuga, both of Susono, Japan

[73] Assignee: Toyota Jidosha Kabushiki Kaisha, Toyota, Japan

[21] Appl. No.: 08/825,748

[22] Filed: Apr. 3, 1997

[30] Foreign Application Priority Data

Apr. 4, 1996 [JP] Japan .................................. 8-082727
Jan. 8, 1997 [JP] Japan .................................. 9-001605

[51] Int. Cl.$^6$ ........................................................ B60J 7/00
[52] U.S. Cl. ........................... 296/188; 296/63; 296/189; 296/204; 296/203.01; 296/203.03; 296/209
[58] Field of Search ............................ 296/63, 188, 189, 296/204, 203.01, 203.03, 209

[56] References Cited

U.S. PATENT DOCUMENTS

| | | | |
|---|---|---|---|
| 2,370,211 | 2/1945 | Ulrich | 296/203.03 |
| 4,572,571 | 2/1986 | Malen | 296/204 |
| 4,892,350 | 1/1990 | Kijima | 296/204 |
| 5,127,704 | 7/1992 | Komatsu | 296/204 |
| 5,388,885 | 2/1995 | Warren | 296/203.03 |
| 5,671,968 | 9/1997 | Masuda et al. | 296/209 |

FOREIGN PATENT DOCUMENTS

| | | | |
|---|---|---|---|
| 195 31 982 | 3/1996 | Germany . | |
| 332989 | 2/1991 | Japan | 296/209 |
| 3-051687 | 5/1991 | Japan . | |
| 3-071980 | 7/1991 | Japan . | |
| 91/04174 | 4/1991 | WIPO . | |

*Primary Examiner*—Joseph D. Pape
*Assistant Examiner*—Kiran Patel
*Attorney, Agent, or Firm*—Pillsbury Madison & Sutro LLP

[57] ABSTRACT

A lower body structure for a vehicle having a pair of side sills provided respectively at vehicle transverse ends of a floor panel in such a manner as to extend in a longitudinal direction of the vehicle includes: a floor-panel reinforcing member disposed on an underside of the floor panel in such a manner as to extend in the longitudinal direction of the vehicle at a position spaced apart from each of the side sills in a transversely inward direction of the vehicle; and a side-sill reinforcing member disposed on an upper surface of the floor panel in such a manner as to extend in a transverse direction of the vehicle and connect a vehicle transverse inner side portion of each of the side sills and the floor panel, wherein the side-sill reinforcing member is provided such that a portion of the floor panel which extends from each of the side sills to a position spaced apart a predetermined distance from the floor-panel reinforcing member in a transversely outward direction of the vehicle is reinforced along the transverse direction of the vehicle, the reinforced portion of the floor panel being adapted to undergo displacement toward a side wall surface of the floor-panel reinforcing member due to an impact force occurring at a time of a side collision.

8 Claims, 11 Drawing Sheets

0
LOWER BODY STRUCTURE FOR VEHICLE

BACKGROUND OF THE INVENTION

1. Field of the Invention

The present invention relates to a lower body structure for a vehicle, and more particularly to a lower body structure for a vehicle which limits collapsing of a side sill toward the interior of a vehicle compartment during a side collision.

2. Description of the Related Art

Conventionally, in vehicles such as automobiles, structures for suppressing the entry of a side sill into the interior of a vehicle compartment in an inclined manner during a side collision are known. For example, Japanese Utility Model Application Laid-Open (JP-U) No. 71980/1991 discloses a structure for suppressing the rotational displacement of a side sill by means of a scarf plate, and Japanese Utility Model Application Laid-Open (JP-U) No. 51687/1991 provides another example of such a structure. Hereafter, a description will be given of Japanese Utility Model Application Laid-Open (JP-U) No. 51687/1991.

Figure 11:
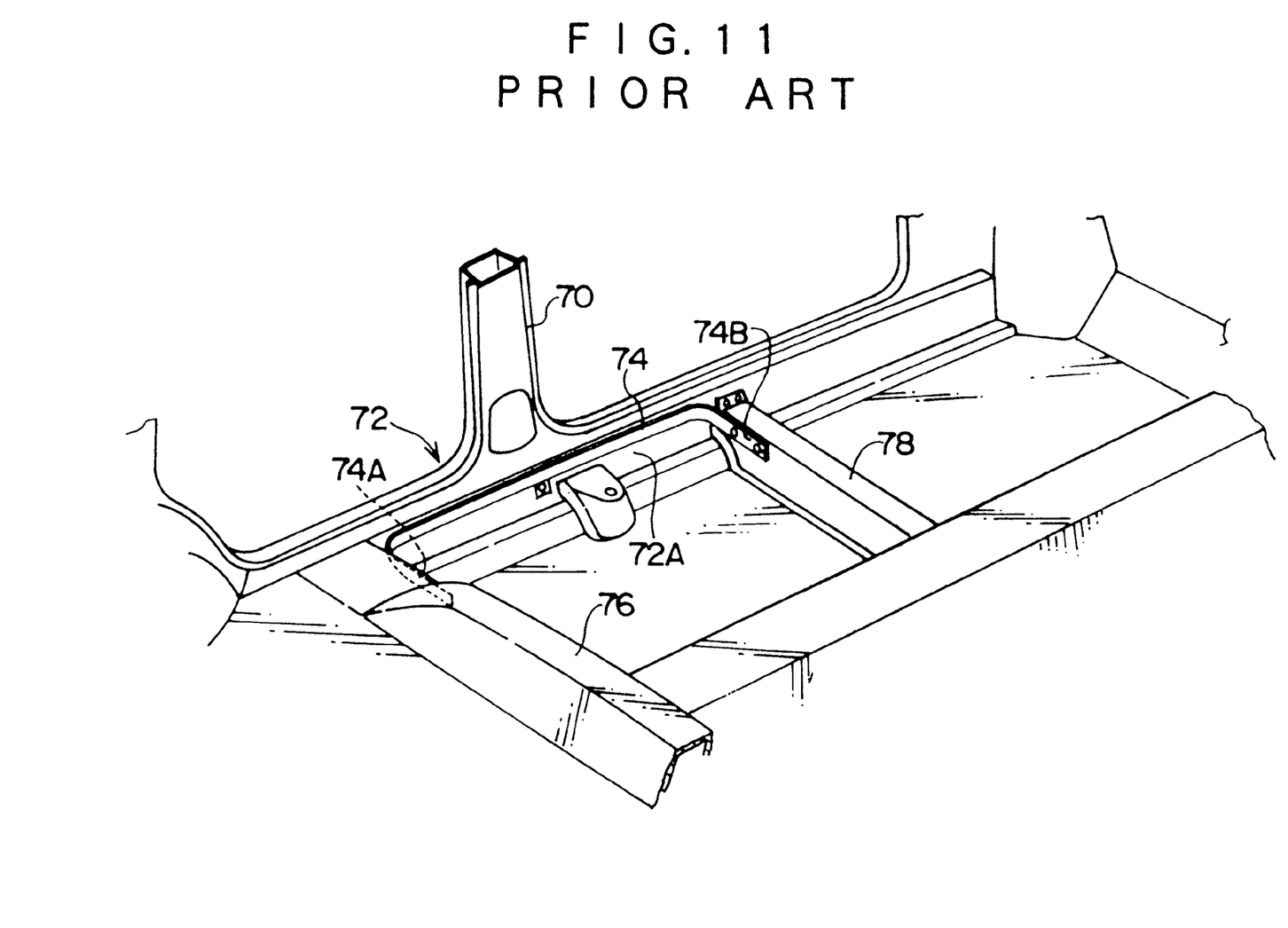
FIG. 11 is a perspective view illustrating a lower body structure for a vehicle in accordance with a conventional example.

As shown in FIG. 11, in this lower body structure for a vehicle, even if a large impact load is applied to a door or a center pillar 70 transversely from the outer side of the vehicle during a side collision, and a force is thereby produced for causing a side sill 72 to enter the interior of the vehicle compartment in an inclined manner, it is possible to prevent entry of the side sill 72 into the interior because the side sill 72 is supported by floor cross members 76 and 78 via a reinforcement 74 disposed on a vehicle transverse inner side surface 72A of the side sill 72.

With this lower body structure for a vehicle, an attempt is merely made to suppress entry of the side sill 72 in an inclined manner by supporting, in a load dispersing manner, the impact load from a side collision by the floor cross members 76 and 78 via the reinforcement 74. No attempt is made, however, to suppress the entry of the side sill in an inclined manner while also effectively absorbing the side collision impact load through the deformation of the vehicle body. Namely, two important considerations in design of the body structure which take the side collision into consideration are the following: First, the body structure must be able to suppress the entry of the center pillar into the interior of the vehicle compartment while preventing the inward collapsing of the side sill. Second, the body structure must be able to effectively absorb an impact load due to a side collision through the deformation of the vehicle body.

Contrary to these considerations with the lower body structure for a vehicle shown in FIG. 11, if the inward collapsing of the side sill 72 is suppressed by the floor cross members 76 and 78, the absorption of the impact load due to the side collision is primarily derived only from the impact absorbing capabilities based on the deformation of the center pillar 70. In this case, a large impact load is applied to a connecting portion between the center pillar 70 and the side sill 72, so that the center pillar 70 is bent at its connecting portion with the side sill 72, thereby making it impossible to produce a reaction force for resisting the impact load.

In addition, if it is assumed that the connection between the side sill 72 and the center pillar 70 is firm and is unbendable, the impact load at the time of the side collision is transmitted from the center pillar 70 to the floor cross members 76 and 78 via the side sill 72 (and the reinforcement 74), so that there is a possibility of the floor cross members 76 and 78 becoming bent substantially. If the floor cross members 76 and 78 are bent substantially, the side sill 72 collapses inwardly in conjunction with the bending of the floor cross members 76 and 78.

SUMMARY OF THE INVENTION

In view of the above-described circumstances, it is an object of the present invention to provide a lower body structure for a vehicle which is capable of effectively suppressing the collapsing of a side sill toward the inner side of a vehicle compartment at the time of a side collision.

To this end, in accordance with a first aspect of the present invention, there is provided a lower body structure for a vehicle having a pair of side sills provided respectively at vehicle transverse ends of a floor panel in such a manner as to extend in a longitudinal direction of the vehicle, comprising: floor-panel reinforcing means disposed on an underside of the floor panel in such a manner as to extend in the longitudinal direction of the vehicle at a position spaced apart from each of the side sills in a transversely inward direction of the vehicle; and side-sill reinforcing means disposed on an upper surface of the floor panel in such a manner as to extend in a transverse direction of the vehicle and connect a vehicle transverse inner side portion of each of the side sills and the floor panel, wherein the side-sill reinforcing means is provided such that a portion of the floor panel which extends from each of the side sills to a position spaced apart a predetermined distance from the floor-panel reinforcing means in a transversely outward direction of the vehicle is reinforced along the transverse direction of the vehicle, the reinforced portion of the floor panel being adapted to undergo displacement toward a side wall surface of the floor-panel reinforcing means due to an impact force occurring at a time of a side collision.

Accordingly, the portion of the floor panel reinforced by the side-sill reinforcing means undergoes displacement toward the side wall surface of the floor-panel reinforcing means. However, since the displacement is supported by a high load of reaction force provided by the floor-panel reinforcing means, the inward collapsing and entry of the side sill can be suppressed by a high load of reaction force provided by the floor-panel reinforcing means while the impact force at the time of the side collision is being effectively absorbed on the basis of the displacement. Accordingly, there is an outstanding advantage in that it is possible to effectively suppress the inclination of the side sill toward the inner side of the vehicle compartment at the time of the side collision.

In accordance with a second aspect of the present invention, in the lower body structure for a vehicle according to the first aspect of the invention, the side-sill reinforcing means is provided in spaced-apart relation to the floor-panel reinforcing means, and is at least provided in such a manner as to be spaced apart therefrom such a distance that allows the side-sill reinforcing means to be displaced toward the side wall surface of the floor-panel reinforcing means via the floor panel, and is at most provided in such a manner as to be spaced apart therefrom such a distance that allows the side-sill reinforcing means to be displaced toward the side wall surface of the floor-panel reinforcing means via the floor panel and to abut against and be supported by the side wall surface of the floor-panel reinforcing means.

Accordingly, the side-sill reinforcing means undergoes displacement toward the side wall surface of the floor-panel reinforcing means, or the side-sill reinforcing means undergoes displacement toward the side wall surface of the floor-panel reinforcing means and abuts against or is supported by the side wall surface of the floor-panel reinforcing means. For this reason, the entry of the side-sill reinforcing means can be reliably supported by the bending yield strength of the floor-panel reinforcing means.

In accordance with a third aspect of the present invention, in the lower body structure for a vehicle according to the second aspect of the invention, the side-sill reinforcing means is at most provided in such a manner as to be spaced apart from the floor-panel reinforcing means such a distance that allows the side-sill reinforcing means to be displaced toward the side wall surface of the floor-panel reinforcing means via the floor panel and to abut against and be supported by the side wall surface of the floor-panel reinforcing means at a position in a vicinity of a straight line passing a center of a cross section of the floor-panel reinforcing means.

Accordingly, since the side-sill reinforcing means at most abuts against and is supported by the side wall surface of the floor-panel reinforcing means at the position in the vicinity of the straight line passing the center of the cross section of the floor-panel reinforcing means, the deformation mode of the floor-panel reinforcing means is difficult to become a twisting mode, so that the entry of the side-sill reinforcing means can be reliably supported by the bending yield strength of the floor-panel reinforcing means, which is higher than the twisting yield strength thereof.

In accordance with a fourth aspect of the present invention, in the lower body structure for a vehicle according to the third aspect of the invention, the side-sill reinforcing means is a seat-supporting bracket, and further includes a floor cross member extending in the transverse direction of the vehicle for connecting the pair of side sills provided respectively at the transverse ends of the vehicle, the floor cross member being provided on at least one of front and rear sides of the seat-supporting bracket at a predetermined interval from the seat-supporting bracket.

Accordingly, since the floor cross member is provided, the field of tension which is formed by the floor panel is supported by the floor cross member, the entry of the side sill toward the inner side of the vehicle compartment can be supported with a high load of reaction force.

In accordance with a fifth aspect of the present invention, in the lower body structure for a vehicle according to the second aspect of the invention, the side-sill reinforcing means is a floor cross member which is disposed in a transverse direction of the vehicle in such a manner as to extend between the pair of side sills provided respectively at the transverse ends of the vehicle, and if a position at the floor cross member which is spaced apart from the floor-panel reinforcing means the predetermined distance that allows the floor cross member to be displaced toward the side wall surface of the floor-panel reinforcing means via the floor panel at the time of the side collision is set as a reference position, a portion of the floor cross member which is located on a vehicle transverse outer side of the reference position is provided with relatively greater strength than a portion of the the floor cross member which is located on.a vehicle transverse inner side of the reference position.

Accordingly, the floor cross member can be displaced at a position remote from the side sill, and the inward collapsing and entry of the side sill can be suppressed by a high load of reaction force provided by the floor-panel reinforcing means while the impact force at the time of the side collision is being effectively absorbed on the basis of the displacement. In addition, since it is unnecessary to add a new member as the side-sill reinforcing means, there is an outstanding advantage in that an increase in the weight of the vehicle body can be suppressed.

The above and other objects, features and advantages of the present invention will become more apparent from the following detailed description of the invention when read in conjunction with the accompanying drawings.

DESCRIPTION OF THE PREFERRED EMBODIMENTS

Figure 1:
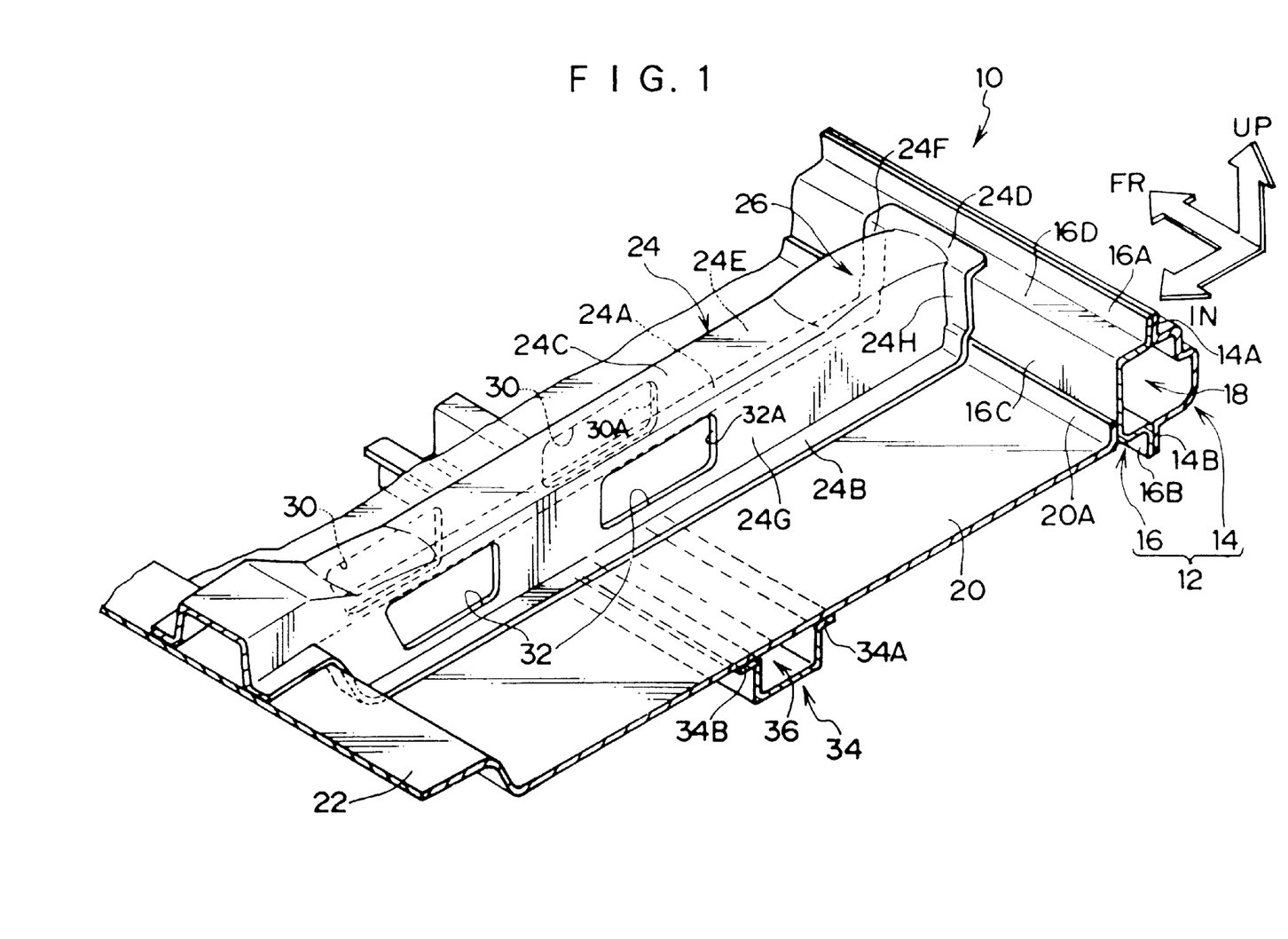
FIG. 1 is a perspective view taken from a diagonally rear inward side of the vehicle and illustrates a lower body structure for a vehicle in accordance with a first embodiment of the present invention.
Figure 2:
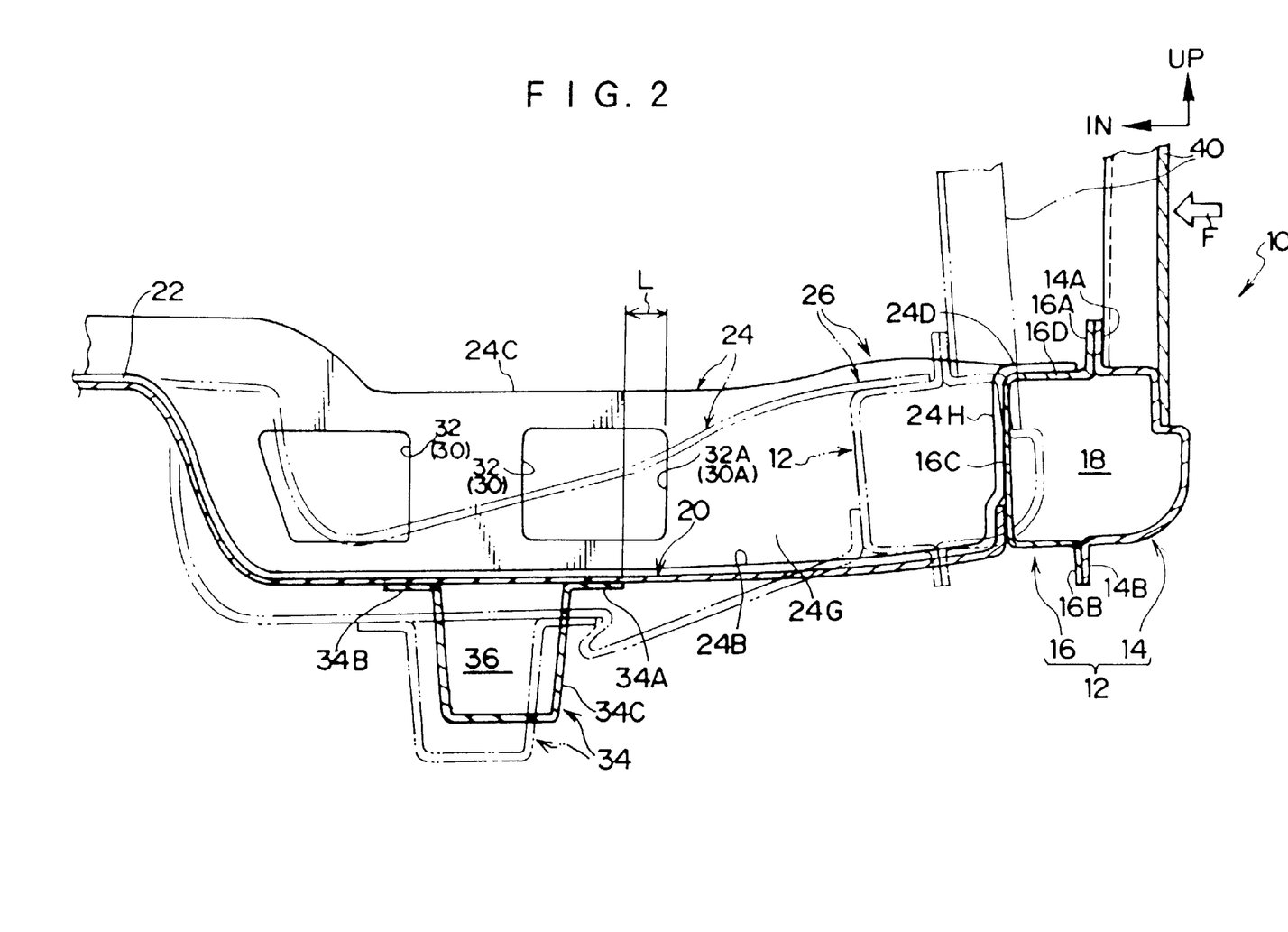
FIG. 2 is a cross sectional view taken from a rear side of the vehicle and illustrates the lower body structure for a vehicle in accordance with the first embodiment of the present invention.

Referring now to FIGS. 1 and 2, a description will be given of a first embodiment of the lower body structure for a vehicle in accordance with the present invention. Incidentally, in the drawings, arrow FR denotes a forward direction of the vehicle, arrow UP denotes an upward direction of the vehicle, and arrow IN denotes a transversely inward direction of the vehicle.

As shown in FIG. 1, a vehicle body 10 in accordance with this first embodiment has a pair of left and right side sills 12 which are respectively disposed at vehicle transverse ends of a lower portion of the vehicle body in such a manner as to extend in the longitudinal direction of the vehicle body (the side sill on the left-hand side of the vehicle is not shown).

As shown in FIG. 2, the side sill 12 is comprised of a side sill outer panel 14, which constitutes a vehicle transverse outer side portion of the side sill 12, and a side sill inner panel 16, which constitutes a vehicle transverse inner side portion of the side sill 12. The side sill outer panel 14 has a substantially U-shaped cross section whose opening faces the transversely inner side of the vehicle, and an upper flange 14A and a lower flange 14B are formed at an end of its opening. Meanwhile, the side sill inner panel 16 similarly has a substantially U-shaped cross section whose opening faces the transversely outer side of the vehicle, and an upper flange 16A and a lower flange 16B are formed at an end of its opening.

The upper flange 14A and the lower flange 14B of the side sill outer panel 14 are respectively welded to the upper flange 16A and the lower flange 16B of the side sill inner panel 16 by spot welding, so that the side sill 12 has a hollow portion 18 which extends in the longitudinal direction of the side sill 12.

As shown in FIG. 1, a flange 20A, which is formed at a vehicle transverse outer side of a floor panel 20 in such a manner as to rise upward, is welded to a lower end of a vertical wall portion 16C of the side sill inner panel 16 by spot welding. In addition, a tunnel portion 22 is formed in a vehicle transverse central portion of the floor panel 20, and the tunnel portion 22 protrudes in the upward direction of the vehicle.

A floor cross member 24 serving as a side-sill reinforcing means is disposed on the upper surface of the floor panel 20 in such a manner as to extend in the transverse direction of the vehicle, and the floor cross member 24 connects the left and right side sills 12. The cross section of the floor cross member 24, as viewed in the transverse direction of the vehicle, is substantially U-shaped with an opening facing downward, and a front flange 24A and a rear flange 24B are formed at an end of the opening. The front flange 24A and the rear flange 24B are welded to the floor panel 20 by spot welding.

A flange 24D is formed at a vehicle transverse outer end of a top wall portion 24C of the floor cross member 24 in such a manner as to project toward the transversely outer side of the vehicle. This flange 24D is welded to a top wall portion 16D of the side sill inner panel 16. Meanwhile, a flange 24F is formed at a vehicle transverse outer end of a front wall portion 24E of the floor cross member 24 in such a manner as to project toward the front side of the vehicle. This flange 24F is welded to the vertical wall portion 16C of the side sill inner panel 16 and the flange 20A of the floor panel 20. A flange 24H is formed at a vehicle transverse outer end of a rear wall portion 24G of the floor cross member 24 in such a manner as to project toward the rear side of the vehicle. This flange 24H is welded to the vertical wall portion 16C of the side sill inner panel 16 and the flange 20A of the floor panel 20.

A portion 26 located in the vicinity of each vehicle transverse opposite end of the floor cross member 24 protrudes upwardly and has a large cross section. Punched holes 30 and 32 are formed in the floor cross member 24. Specifically, two punched holes 30 are formed in the front wall portion 24E of the floor cross member 24 along the transverse direction of the vehicle on each vehicle transverse side of the tunnel portion 22. Meanwhile, two punched holes 30 are similarly formed in the rear wall portion 24G of the floor cross member 24 along the transverse direction of the vehicle on each vehicle transverse side of the tunnel portion 22.

Two floor under reinforcements 34 (only one is shown in FIG. 1) serving as floor-panel reinforcing means are disposed on the underside of the floor panel 20 in such a manner as to extend in the longitudinal direction of the vehicle at positions each spaced apart from the side sill 12 in the transversely inward direction of the vehicle.

As shown in FIG. 2, positions 30A and 32A, which are respectively located at vehicle transverse outer ends of the punched holes 30 and 32 formed in the floor cross member 24, are located on the vehicle transverse outer side of the floor under reinforcement 34. Further, the positions 30A and 32A are each located at a position spaced apart a predetermined distance L from an outer flange 34A of the floor under reinforcement 34. Thus a portion of the floor cross member 24 which is capable of undergoing deformation via the floor panel 20 toward a side wall surface 34C of the floor under reinforcement 34 is located between each position 30A, 32A and the outer flange 34A of the floor under reinforcement 34. Accordingly, if these positions 30A and 32A are assumed to be reference positions, the portion of the cross member 24 which is located on the vehicle transverse outer side of the reference positions 30A and 32A is provided with relatively greater strength than the portion of the cross member 24 which is located on the vehicle transverse inner side of the reference positions 30A and 32A.

The cross-sectional shape of the floor under reinforcement 34, as viewed in the longitudinal direction of the vehicle, is substantially U-shaped with an opening facing upward, and the outer flange 34A and an inner flange 34B are formed at an end of the opening. The outer flange 34A and the inner flange 34B are welded to the floor panel 20 by spot welding. The floor under reinforcement 34 together with the floor panel 20 forms a hollow portion 36 which extends in the longitudinal direction of the vehicle.

Next, a description will be given of the operation of the first embodiment.

In this first embodiment, as shown in FIG. 2, when a large impact load is applied to the door and a center pillar 40 (a pillar inner panel thereof is not shown) from the transversely outer side of the vehicle (in the direction of arrow F in FIG. 2) due to a side collision, the impact load is transmitted to the floor cross member 24 via the center pillar 40 and the side sill 12. Hence, the cross member 24 is subjected to a rotating force acting in a direction in which the cross member 24 is inclined together with the side sill 12 toward the inner side of the vehicle compartment. Member 24 is also subject to an entering force acting in a direction in which the cross member 24 enters together with the side sill 12 toward the inner side of the vehicle compartment. At this time, as for the rotating force acting on the cross member 24 in the direction in which the cross member 24 is inclined together with the side sill 12, as indicated by two-dotted dash lines in FIG. 2, the rotation is allowed in a range in which the portions of the cross member 24 corresponding to the range of the predetermined distance L can be deformed. The impact load is absorbed in this allowable range in which the rotation is permitted, and further inclination of the cross member 24, i.e., the side sill 12 and the center pillar 40, which exceeds this allowable range is suppressed.

Meanwhile, as for the entering force acting on the cross member 24 in a direction in which the cross member 24 enters toward the inner side of the vehicle compartment, the entry of the side sill 12 is allowed in the range in which the portions of the cross member 24 corresponding to the range of the predetermined distance L can be deformed. The impact load is absorbed in this allowable range in which the entry is permitted, and further entry of the side sill 12 which exceeds this allowable range is suppressed.

Accordingly, when a large side collision impact load is applied to the door and the center pillar 40 from the transversely outer side of the vehicle, and the side sill 12 is subjected to the rotating force whereby it is inclined toward the inner side of the vehicle compartment and to the entering force acting toward the inner side of the vehicle compartment, the impact can be absorbed in the allowable range due to the deformation of the cross member 24 and the floor panel 20. Also, it is possible to suppress the inclination of the side sill 12 and the cross member 24 toward the inner side of the vehicle compartment and the entry thereof toward the inner side of the vehicle compartment which exceed the allowable range. For this reason, it is possible to effectively suppress the inclination of the side sill toward the inner side of the vehicle compartment at the time of the side collision.

In addition, in this first embodiment, since the cross member 24 is used as the side-sill reinforcing means, it is unnecessary to add a new member as the side-sill reinforcing means. For this reason, it is possible to suppress the inclination of the side sill toward the inner side of the vehicle compartment while preventing an increase in the weight of the vehicle body.

Incidentally, the arrangement in which the strength of the floor cross member 24 is varied along the transverse direction of the vehicle is not limited to that used in this first embodiment. For instance, instead of enlarging the cross-sectional area of the floor cross member 24, it is possible to adopt other arrangements, such as the enlargement of its plate thickness or the addition of reinforcing members, and instead of forming the punched holes 30 and 32 in the floor cross member 24, it is possible to adopt other arrangements, such as the formation of slits, the reduction of its cross-sectional area, or the reduction of its plate thickness.

Referring now to FIGS. 3 to 6, a description will be given of a second embodiment of the lower body structure for a vehicle in accordance with the present invention. Incidentally, the same members as those of the first embodiment will be denoted by the same reference numerals, and a description thereof will be omitted.

Figure 3:
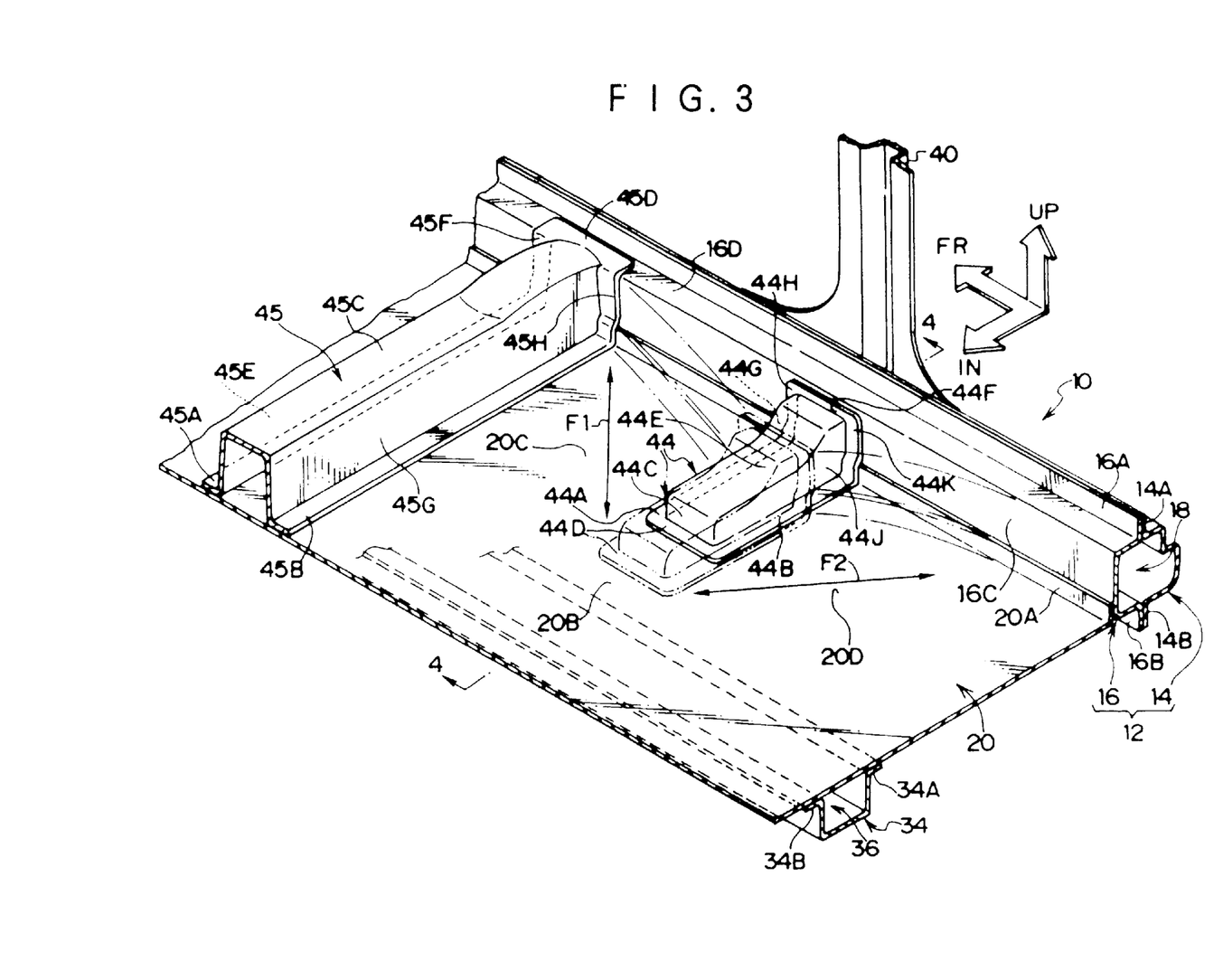
FIG. 3 is a perspective view taken from the diagonally rear inward side of the vehicle and illustrates the lower body structure for a vehicle in accordance with a second embodiment of the present invention.

As shown in FIG. 3, in this second embodiment, the side sill 12 is provided with a seat-supporting bracket 44 serving as a side-sill reinforcing means. The seat-supporting bracket 44 is provided on a vehicle compartment inner side of that portion of the side sill 12 which is joined to the center pillar 40.

Figure 4:
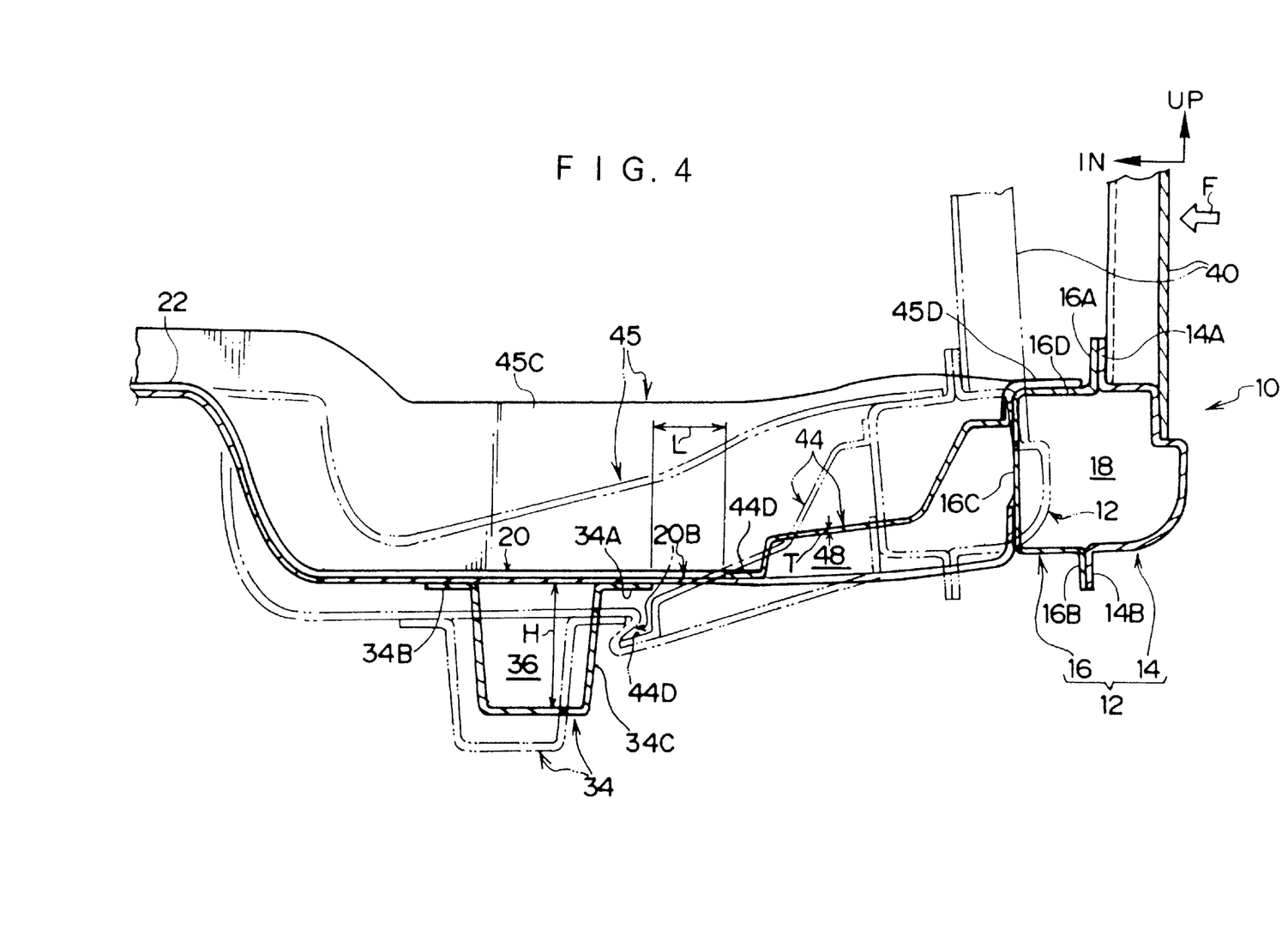
FIG. 4 is a cross-sectional view taken along line 4—4 in FIG. 3.

As shown in FIG. 4, the seat-supporting bracket 44 extends from the vehicle transverse inner side portion of the side sill 12 to a position spaced apart a predetermined distance L from the vehicle transverse outer side of the outer flange 34A of the floor under reinforcement 34. This predetermined distance L is provided such that $3T \leq L \leq 3T+H$, where T is the plate thickness of the cross member 24, and H is the cross-sectional height of the floor under reinforcement 34.

As shown in FIG. 3, the cross-sectional shape of the seat-supporting bracket 44, as viewed in the transverse direction of the vehicle, is substantially U-shaped with an opening facing downward, and a front flange 44A and a rear flange 44B are formed at an end of the opening. In addition, an inner flange 44D is formed at a vehicle transverse inner vertical wall portion 44C of the seat-supporting bracket 44 in such a manner as to extend in the transversely inward direction of the vehicle. The front flange 44A, the rear flange 44B, and the inner flange 44D are welded to the floor panel 20 by spot welding.

A flange 44F is formed at a vehicle transverse outer end of a top wall portion 44E of the seat-supporting bracket 44 in such a manner as to rise upward. This flange 44F is welded to the vertical wall portion 16C of the side sill inner panel 16. Further, a flange 44H is formed at a vehicle transverse outer end of a front wall portion 44G of the seat-supporting bracket 44 in such a manner as to extend in the forward direction of the vehicle. This flange 44H is welded to the vertical wall portion 16C of the side sill inner panel 16 and the flange 20A of the floor panel 20. A flange 44K is formed at a vehicle transverse outer end of a rear wall portion 44J of the seat-supporting bracket 44 in such a manner as to extend in the rearward direction of the vehicle. This flange 44K is welded to the vertical wall portion 16C of the side sill inner panel 16 and the flange 20A of the floor panel 20.

As shown in FIG. 4, a hollow portion 48 which extends in the transverse direction of the vehicle is formed by the floor panel 20 and the seat-supporting bracket 44.

As shown in FIG. 3, a floor cross member 45 is disposed on a vehicle front side of the seat-supporting bracket 44 at a predetermined interval therewith in such a manner as to extend in the transverse direction of the vehicle. The floor cross member 45 connects the left and right side sills 12 located on the transverse ends of the vehicle. The cross section of the floor cross member 45, as viewed in the transverse direction of the vehicle, is substantially U-shaped with an opening facing downward, and a front flange 45A and a rear flange 45B are formed at an end of the opening. The front flange 45A and the rear flange 45B are welded to the floor panel 20 by spot welding.

A flange 45D is formed at a vehicle transverse outer end of a top wall portion 45C of the floor cross member 45 in such a manner as to project toward the transversely outer side of the vehicle. This flange 45D is welded to the top wall portion 16D of the side sill inner panel 16. Meanwhile, a flange 45F is formed at a vehicle transverse outer end of a front wall portion 45E of the floor cross member 45 in such a manner as to project toward the front side of the vehicle. This flange 45F is welded to the vertical wall portion 16C of the side sill inner panel 16 and the flange 20A of the floor panel 20. A flange 45H is formed at a vehicle transverse outer end of a rear wall portion 45G of the floor cross member 45 in such a manner as to project toward the rear side of the vehicle. This flange 45H is welded to the vertical wall portion 16C of the side sill inner panel 16 and the flange 20A of the floor panel 20.

Next, a description will be given of the operation of the second embodiment.

In this second embodiment, as shown in FIG. 4, when a large side collision impact load is applied to the door and the center pillar 40 from the transversely outer side of the vehicle (in the direction of arrow F in FIG. 4), the impact load is transmitted to the seat-supporting bracket 44 via the center pillar 40 and the side sill 12. Hence, the seat-supporting bracket 44 is subjected to a rotating force acting in a direction in which the seat-supporting bracket 44 is inclined together with the side sill 12 toward the inner side of the vehicle compartment. The seat-supporting bracket 44 is also subjected to an entering force acting in a direction in which the seat-supporting bracket 44 enters together with the side sill 12 toward the inner side of the vehicle compartment. At this time, as for the rotating force acting on the seat-supporting bracket 44 in the direction in which the seat-supporting bracket 44 is inclined together with the side sill 12, as indicated by two-dotted dash lines in FIG. 4, the rotation is allowed in a range in which the portion of the floor panel 20 corresponding to the range of the predetermined distance L can be deformed. The impact load is absorbed by the buckling (see the two-dotted dash lines in FIG. 4) of a portion 20B of the floor panel 20 in this allowable range in which the rotation is permitted, and by the in-plane tension (see arrows F1, and F2 in FIG. 3) of floor panel surface portions 20C and 20D located on vehicle front and rear sides of the seat-supporting bracket 44. However, further inclination of the seat-supporting bracket 44, i.e., the side sill 12 and the center pillar 40, which exceeds this allowable range is suppressed.

Meanwhile, as for the entering force acting on the seat-supporting bracket 44 in a direction in which the seat-supporting bracket 44 enters together with the side sill 12 toward the inner side of the vehicle compartment, the entry of the seat-supporting bracket 44 is allowed in the range in which the portion of the portion of the floor panel 20 corresponding to the range of the predetermined distance L can be deformed. The impact load is absorbed by the buckling (see the two-dotted dash lines in FIG. 4) of the portion 20B of the floor panel 20 in this allowable range in which the entry is permitted, and by the in-plane tension (see arrows F1, and F2 in FIG. 3) of the floor panel surface portions 20C and 20D located on the front and rear sides of the seat-supporting bracket 44. However, further entry of the seat-supporting bracket 44, i.e., the side sill 12 and the center pillar 40, which exceeds this allowable range is suppressed.

Figure 5:
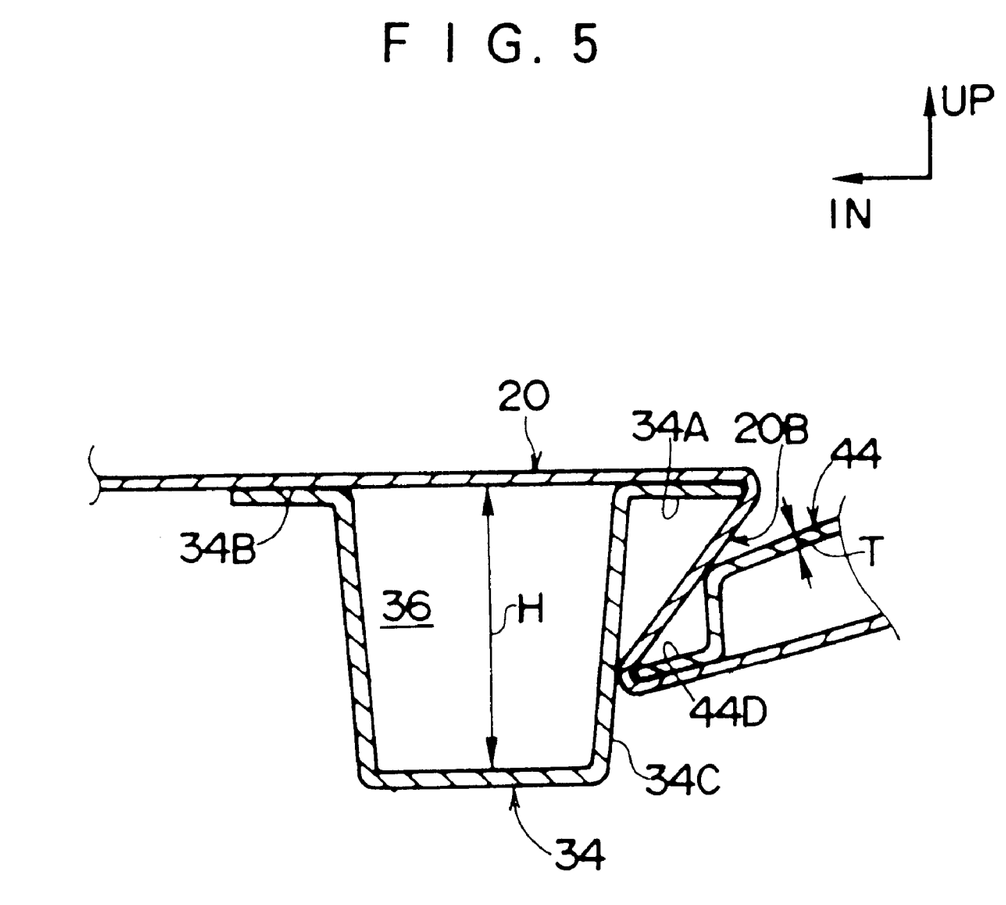
FIG. 5 is an enlarged cross-sectional view taken from the rear side of the vehicle and illustrates a deformed state of a part of the lower body structure for a vehicle in accordance with the second embodiment of the present invention.

Further, as shown in FIG. 5, the seat-supporting bracket 44 is provided in such a manner as to extend from the vehicle transverse inner side portion of the side sill 12 to the position which is spaced the distance L from the outer side of the outer flange 34A of the floor under reinforcement 34. Thus, after buckling of the portion 20B of the floor panel 20, the seat-supporting bracket 44 finally abuts against and is supported by the vehicle transverse outer side wall 34C of the floor under reinforcement 34 with a portion of the floor panel 20 nipped therebetween. Accordingly, it is possible to reliably support the entry of the seat-supporting bracket 44 by the bending yield strength of the floor under reinforcement 34.

Figure 6:
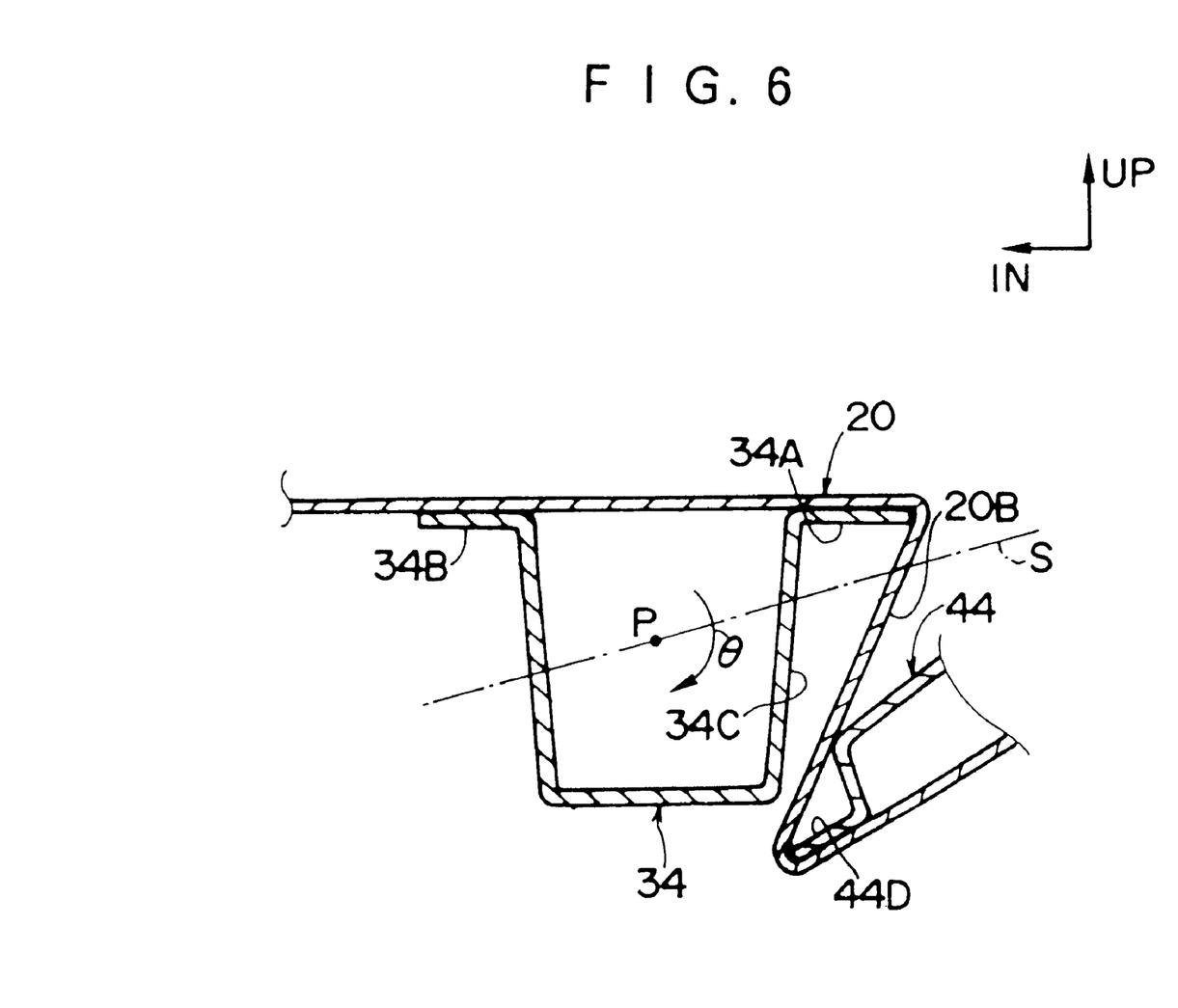
FIG. 6 is an enlarged cross-sectional view taken from the rear side of the vehicle and illustrates a deformed state of the part of the lower body structure for a vehicle in accordance with the second embodiment of the present invention.

Incidentally, if the distance L is not set to 3T+H or less, the seat-supporting bracket 44 sinks below the floor under reinforcement 34, as shown in FIG. 6, due to the application of the force from the seat-supporting bracket 44. Thus, the deformation mode of the floor under reinforcement becomes one of twisting in the clockwise rotation (in the direction arrow θ in FIG. 6) about a center P of the cross section of the floor under reinforcement 34. In addition, since the yield strength with respect to the mode of twisting deformation of the floor under reinforcement 34 is lower than the yield strength with respect to the mode of bending deformation, the floor under reinforcement 34 is buckled under a low load in this case, and the deformation becomes large. Therefore, to suppress this twisting deformation mode, it is preferable to set the predetermined distance L such that the position of abutment of the seat-supporting bracket against the vehicle transverse outer side wall 34C of the floor under reinforcement 34 is located in the vicinity of a straight line S which passes the center P of the cross section of the floor under reinforcement 34 and is inclined toward a position below the transverse center of the vehicle. In this case it is difficult for, the deformation mode of the floor under reinforcement 34 to become the twisting mode, so that the entry of the seat-supporting bracket 44 can be reliably supported by the bending yield strength of the floor under reinforcement 34, which is higher than the twisting yield strength thereof.

On the other hand, if the distance L is not set to 3T or more, the seat-supporting bracket 44 is unable to enter the lower side of the floor panel 20, and is displaced on the upper surface of the floor panel 20 in the transversely inward direction of the vehicle. Hence, a force in a shearing direction acts on the welding portion between the seat-supporting bracket 44 and the floor panel 20, so that the welding strength declines, thereby making it impossible to support the entry of the seat-supporting bracket 44 in the transversely inward direction of the vehicle by means of a high load of reaction force.

Accordingly, as the predetermined distance L is set such that $3T \leq L \leq 3T+H$, when a large impact load is applied to the door and the center pillar 40 from the transversely outer side of the vehicle at the time of a side collision, and the side sill 12 is subjected to both the rotating force, whereby it is inclined toward the inner side of the vehicle compartment, and the entering force, acting toward the inner side of the vehicle compartment, the impact can be absorbed by the buckling and in-plane tension of the floor panel 20 due to the inclination and entry of the seat-supporting bracket 44 toward the inner side of the vehicle compartment in the allowable range. At the same time, it is possible to suppress the inclination of the side sill 12 toward the inner side of the vehicle compartment and the entry thereof toward the inner side of the vehicle compartment which exceed the allowable range. For this reason, it is possible to effectively suppress the inclination of the side sill toward the inner side of the vehicle compartment at the time of the side collision.

In addition, in this second embodiment, since the seat-supporting bracket 44 is used as the side-sill reinforcing means, it is unnecessary to add an additional member as the side-sill reinforcing means. For this reason, it is possible to suppress the inclination of the side sill toward the inner side of the vehicle compartment while preventing an increase in the weight of the vehicle body.

Referring now to FIGS. 7 to 10, a description will be given of a third embodiment of the lower body structure for a vehicle in accordance with the present invention. Incidentally, the same members as those of the second embodiment will be denoted by the same reference numerals, and a description thereof will be omitted.

Figure 7:
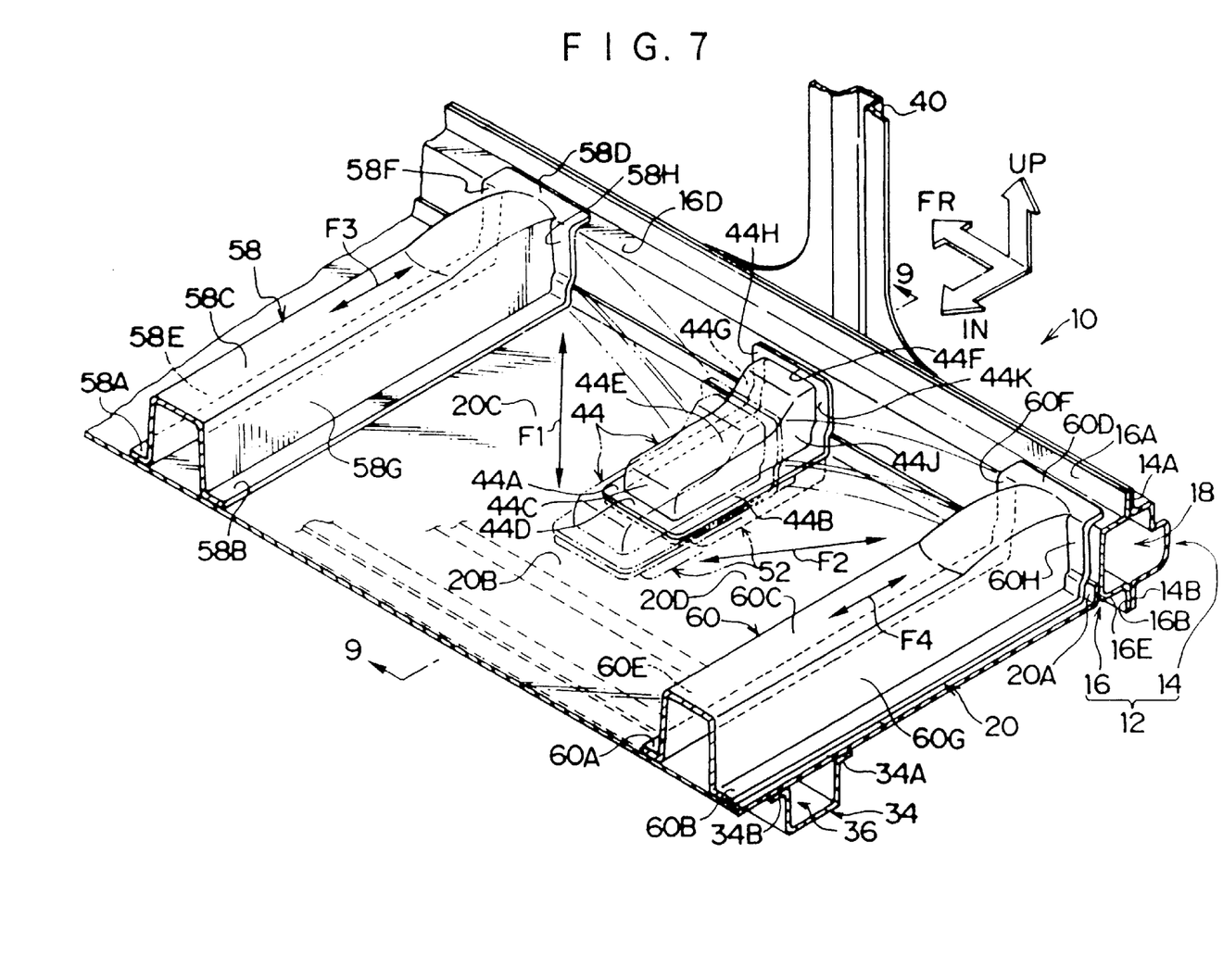
FIG. 7 is a perspective view taken from the diagonally rear inward side of the vehicle and illustrates the lower body structure for a vehicle in accordance with a third embodiment of the present invention.

As shown in FIG. 7, in this third embodiment, a lower seat-supporting bracket 52 serving as another side-sill reinforcing means is disposed underneath the seat-supporting bracket 44 in such a manner as to nip the floor panel 20 in cooperation with the seat-supporting bracket 44. Incidentally, the portion of the floor panel 20 between the seat-supporting bracket 44 and the lower seat-supporting bracket 52 is formed in the shape of a flat plate.

In addition, floor cross members 58 and 60 are respectively disposed on vehicle front and rear sides of the seat-supporting bracket 44 at predetermined intervals therewith in such a manner as to extend in the transverse direction of the vehicle. The floor cross members 58 and 60 connect the left and right side sills 12 located on the transverse ends of the vehicle. The cross section of each of the floor cross members 58 and 60, as viewed in the transverse direction of the vehicle, is substantially U-shaped with an opening facing downward, and front flanges 58A and 60A and rear flanges 58B and 60B are formed at respective ends of their openings. The front flanges 58A and 60A and the rear flanges 58B and 60B are welded to the floor panel 20 by spot welding.

Flange 58D and 60D are formed at respective vehicle transverse outer ends of top wall portions 58C and 60C of the floor cross members 58 and 60 in such a manner as to project toward the transversely outer side of the vehicle. These flanges 58D and 60D are welded to the top wall portion 16D of the side sill inner panel 16. Meanwhile, flanges 58F and 60F are formed at respective vehicle transverse outer ends of front wall portion 58E and 60E of the floor cross members 58 and 60 in such a manner as to project toward the front side of the vehicle. These flanges 58F and 60F are welded to the vertical wall portion 16C of the side sill inner panel 16 and the flange 20A of the floor panel 20. Flanges 58H and 60H are formed at respective vehicle transverse outer ends of rear wall portions 58G and 60G of the floor cross members 58 and 60 in such a manner as to project toward the rear side of the vehicle. These flanges 58H and 60H are welded to the vertical wall portion 16C of the side sill inner panel 16 and the flange 20A of the floor panel 20.

Figure 8:
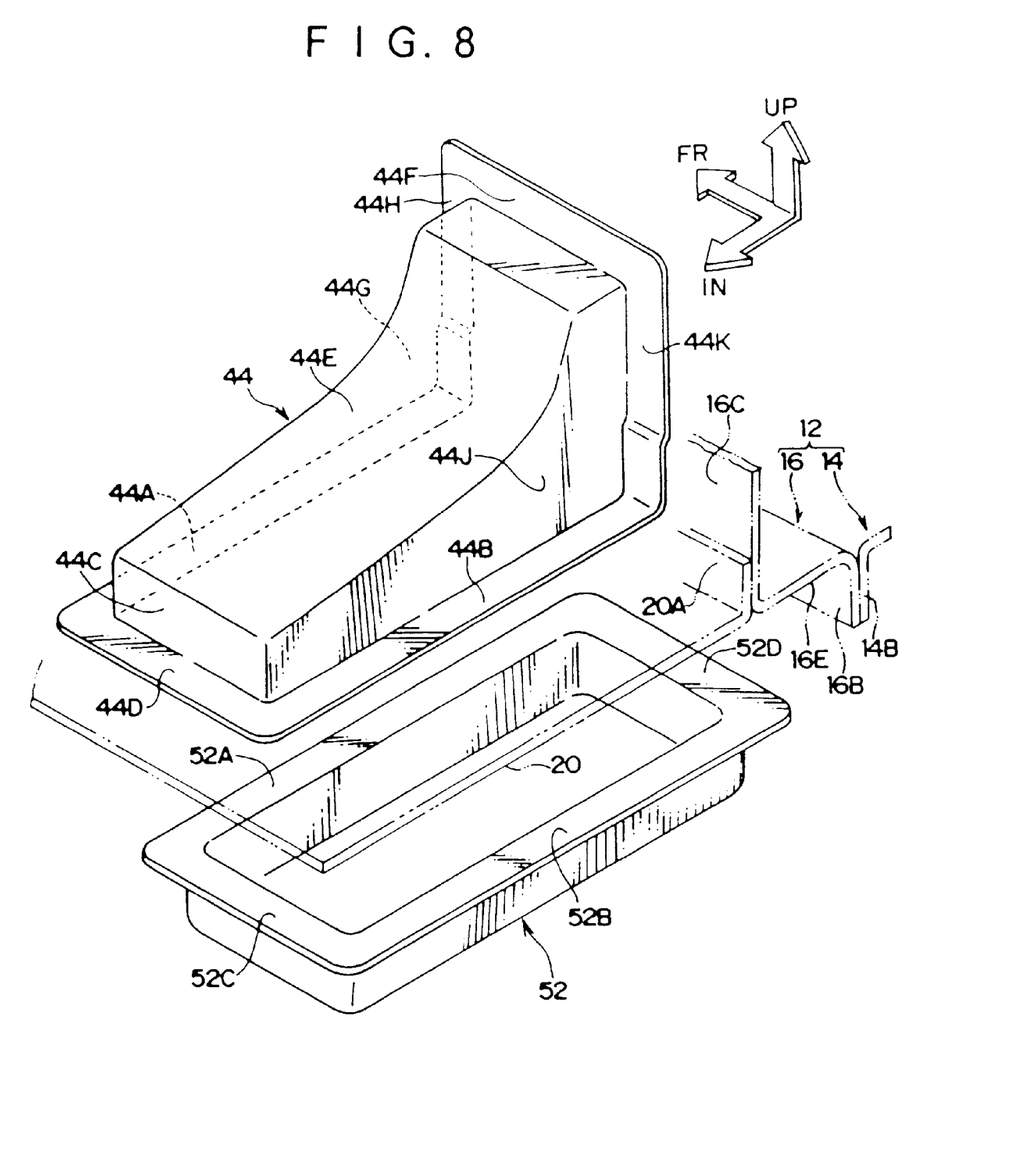
FIG. 8 is an exploded perspective view taken from the diagonally rear inward side of the vehicle and illustrates a seat-supporting bracket and a lower seat-supporting bracket of the lower body structure for a vehicle in accordance with the third embodiment of the present invention.

As shown in FIG. 8, the lower seat-supporting bracket 52 is formed in the shape of a pan, and a front flange 52A, a rear flange 52B, and an inner flange 52C which are formed at peripheral edges of the opening are respectively connected to the front flange 44A, the rear flange 44B, and the inner flange 44D of the seat-supporting bracket 44 with the floor panel 20 nipped therebetween.

Figure 9:
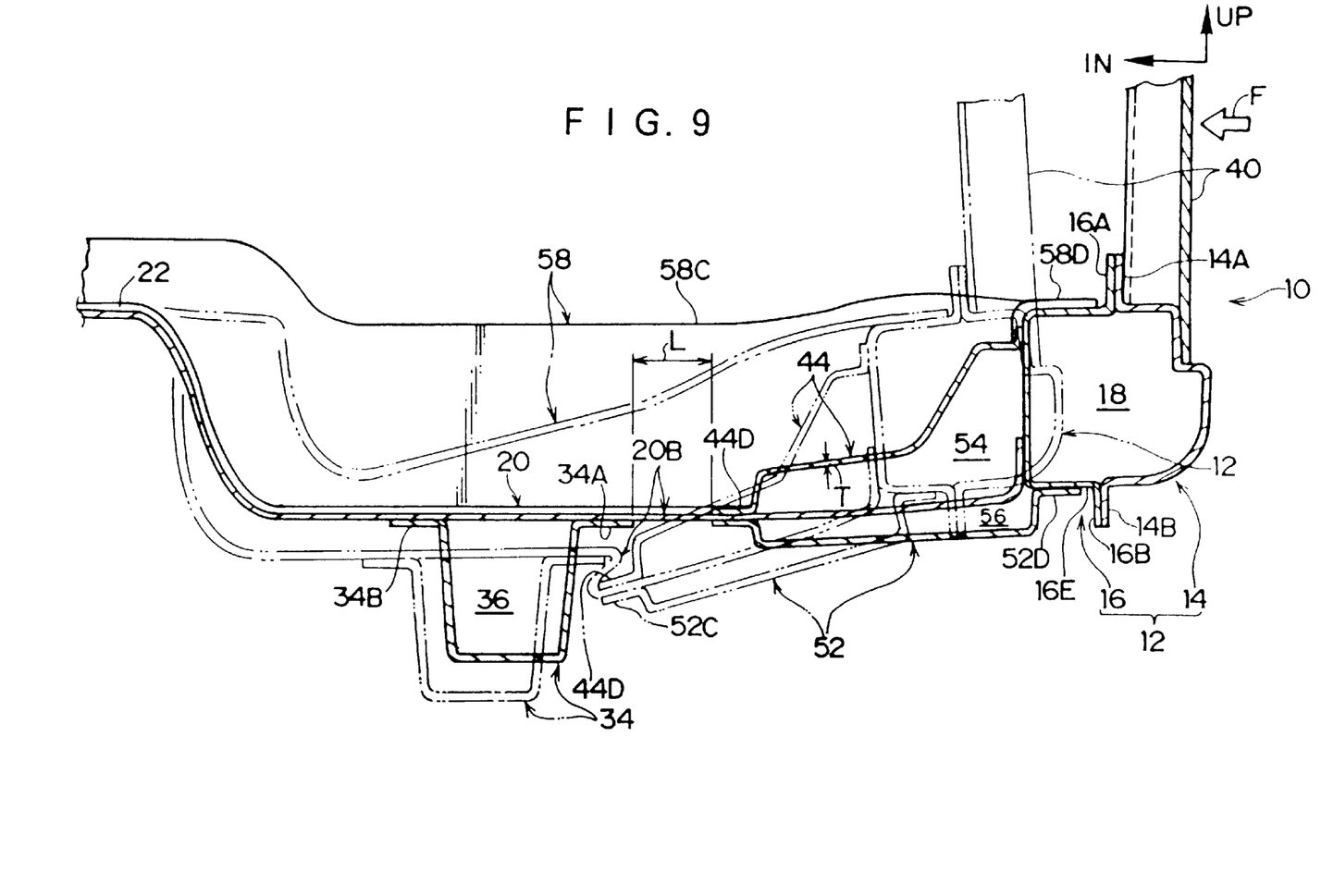
FIG. 9 is a cross-sectional view taken along line 9—9 in FIG. 7.

As shown in FIG. 9, an outer flange 52D which is formed on an outer-side peripheral edge at the opening of the lower seat-supporting bracket 52 is welded to a bottom wall portion 16E of the side sill inner panel 16. Accordingly, a hollow portion 54 and a hollow portion 56 which respectively extend in the transverse direction of the vehicle are formed by the seat-supporting bracket 44, the floor panel 20, and the lower seat-supporting bracket 52.

Next, a description will be given of the operation of the third embodiment.

In this third embodiment, as shown in FIG. 9, when a large side collision impact load is applied to the door and the center pillar 40 from the transversely outer side of the vehicle (in the direction of arrow F in FIG. 9), the impact load is transmitted to the seat-supporting bracket 44 and the lower seat-supporting bracket 52 via the center pillar 40 and the side sill 12. Hence, the seat-supporting bracket 44 and the lower seat-supporting bracket 52 are subjected to a rotating force acting in a direction in which the seat-supporting bracket 44 and the lower seat-supporting bracket 52 are inclined together with the side sill 12 toward the inner side of the vehicle compartment, as well as to an entering force acting in a direction in which the seat-supporting bracket 44 and the lower seat-supporting bracket 52 enter together with the side sill 12 toward the inner side of the vehicle compartment. At this time, as for the rotating force acting on the seat-supporting bracket 44 and the lower seat-supporting bracket 52 in the direction in which they are inclined together with the side sill 12, as indicated by two-dotted dash lines in FIG. 9, the rotation is allowed in a range in which the portion of the floor panel 20 corresponding to the range of the predetermined distance L can be deformed. The impact load is absorbed by the buckling (see the two-dotted dash lines in FIG. 9) of the portion 20B of the floor panel 20 in this allowable range in which the rotation is permitted, and by the in-plane tension (see arrows F1, and F2 in FIG. 7) of the floor panel surface portions 20C and 20D located on vehicle front and rear sides of the seat-supporting bracket 44 and the lower seat-supporting bracket 52. However, further inclination of the seat-supporting bracket 44 and the lower seat-supporting bracket 52, i.e., the side sill 12 and the center pillar 40, which exceeds this allowable range is suppressed.

Meanwhile, as for the entering force acting on the seat-supporting bracket 44 and the lower seat-supporting bracket 52 in a direction in which the seat-supporting bracket 44 and the lower seat-supporting bracket 52 enter together with the side sill 12 toward the inner side of the vehicle compartment, the entry of the seat-supporting bracket 44 and the lower seat-supporting bracket 52 is allowed in the range in which the portion of the floor panel 20 corresponding to the range of the predetermined distance L can be deformed. The impact load is absorbed by the buckling (see the two-dotted dash lines in FIG. 9) of the portion 20B of the floor panel 20 in this allowable range in which the entry is permitted, and by the in-plane tension (see arrows F1, and F2 in FIG. 7) of the floor panel surface portions 20C and 20D located on the front and rear sides of the seat-supporting bracket 44 and the lower seat-supporting bracket 52. However, further entry of the seat-supporting bracket 44 and the lower seat-supporting bracket 52, i.e., the side sill 12 and the center pillar 40, which exceeds this allowable range is suppressed.

Figure 10:
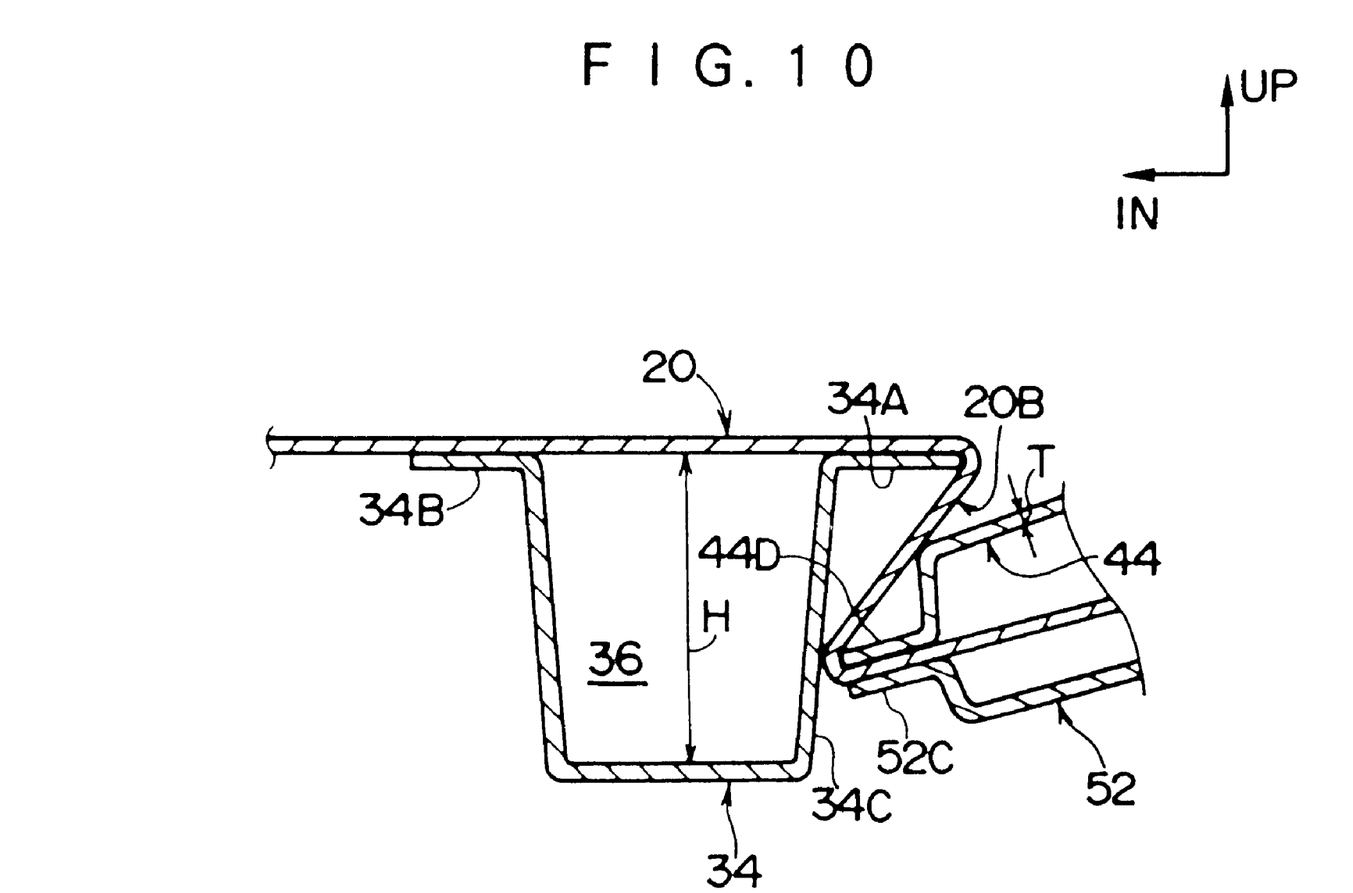
FIG. 10 is an enlarged cross-sectional view taken from the rear side of the vehicle and illustrates a deformed state of a part of the lower body structure for a vehicle in accordance with the third embodiment of the present invention.

Further, as shown in FIG. 10, the seat-supporting bracket 44 and the lower seat-supporting bracket 52 are provided in such a manner as to extend from the vehicle transverse inner side portion of the side sill 12 to the position which is spaced by the distance L from the outer side of the outer flange 34A of the floor under reinforcement 34. Thus, after the buckling of the portion 20B of the floor panel 20, the seat-supporting bracket 44 finally abuts against and is supported by the vehicle transverse outer side wall 34C of the floor under reinforcement 34 with a portion of the floor panel 20 nipped therebetween. Accordingly, it is possible to reliably support the entry of the seat-supporting bracket 44 and the lower seat-supporting bracket 52 by the bending yield strength of the floor under reinforcement 34.

Accordingly, when a large side collision impact load is applied to the door and the center pillar 40 from the transversely outer side of the vehicle, and the side sill 12 is subjected to both the rotating force, whereby it is inclined toward the inner side of the vehicle compartment, and the entering force, acting toward the inner side of the vehicle compartment, the impact can be absorbed by the buckling and in-plane tension of the floor panel 20 due to the inclination and entry of the seat-supporting bracket 44 and the lower seat-supporting bracket 52 toward the inner side of the vehicle compartment in the allowable range. At the same time, it is possible to suppress the inclination of the side sill 12 toward the inner side of the vehicle compartment and the entry thereof toward the inner side of the vehicle compartment which exceed the allowable range. For this reason, it is possible to effectively suppress the inclination of the side sill toward the inner side of the vehicle compartment at the time of the side collision.

Further, in this third embodiment, since the in-plane tension F1 and F2 acting in the floor panel surfaces 20B and 20C can be received by the axial strength (see arrows F3 and F4 in FIG. 7) of the floor cross members 58 and 60, it is possible to more effectively suppress the inclination of the side sill toward the inner side of the vehicle compartment at the time of a side collision.

In addition, in this third embodiment, since the seat-supporting bracket 44 and the lower seat-supporting bracket 52 are used as the side-sill reinforcing means, it is unnecessary to add an additional member as the side-sill reinforcing means. For this reason, it is possible to suppress the inclination of the side sill toward the inner side of the vehicle compartment while preventing an increase in the weight of the vehicle body.

Although a detailed description has been given above of specific embodiments of the present invention, the present invention is not limited to the above-described embodiments, and it will be apparent to those skilled in the art that various other embodiments and modifications are possible within the scope of the present invention.

What is claimed is:

1. A lower body structure for a vehicle having a floor panel and a pair of side sills provided at vehicle transverse ends of the floor panel, the side sills extending in a longitudinal direction of the vehicle, said lower body structure comprising:

floor panel reinforcing means disposed on an underside of the floor panel, spaced inwardly from the side sills in a transverse direction of the vehicle, and extending in a longitudinal direction of the vehicle; and side sill reinforcing means comprising a floor cross member extending in the transverse direction of the vehicle between the pair of side sills and disposed on an upper surface of the floor panel, said side sill reinforcing means being connected to inner side portions of the side sills and to the floor panel, a reference point being defined on said floor cross member at a location spaced outwardly from said floor panel reinforcing means by a predetermined distance in the transverse direction of the vehicle, wherein said floor cross member of said side sill reinforcing means includes punched hole portions formed in front and back walls thereof at positions located inwardly of said reference point in the vehicle transverse direction, so that an extent of said floor cross member located outwardly of said reference point in the vehicle transverse direction has a relatively greater strength than an extent of said floor cross member located inwardly of said reference point in the vehicle transverse direction, so that said side sill reinforcing means reinforces a portion of the floor panel along the transverse direction of the vehicle, the portion of the floor panel reinforced by said side sill reinforcing means extending from each of the side sills to a position spaced outwardly from said floor panel reinforcing means by said predetermined distance in the transverse direction of the vehicle, thereby permitting the portion of the floor panel reinforced by said side sill reinforcing means and a portion of said floor cross member attached to said portion of the floor panel to undergo displacement toward a side wall surface of said floor panel reinforcing means when subjected to a side collision impact force.

2. The lower body structure for a vehicle according to claim 1, wherein said side sill reinforcing means is arranged with respect to said floor panel reinforcing means to permit said side sill reinforcing means to be displaced via the floor panel toward the side wall surface of said floor panel reinforcing means and to abut against and be supported by the side wall surface of said floor panel reinforcing means at a position in a vicinity of a straight line passing through a center of a cross section of said floor panel reinforcing means and inclined toward a position below a transverse center of the vehicle.

3. A lower body structure for a vehicle having a floor panel and a pair of side sills provided at vehicle transverse ends of the floor panel, the side sills extending in a longitudinal direction of the vehicle, said lower body structure comprising:

floor panel reinforcing means disposed on an underside of the floor panel, spaced inwardly from the side sills in a transverse direction of the vehicle, and extending in a longitudinal direction of the vehicle;

side sill reinforcing means comprising a seat supporting bracket, said side sill reinforcing means being disposed on an upper surface of the floor panel and extending in the transverse direction of the vehicle, said side sill reinforcing means being connected to inner side portions of the pair of side sills and to the floor panel, and a floor cross member extending between the pair of side sills in the transverse direction of the vehicle for connecting the pair of side sills, said floor cross member being located on at least one of a front side and rear side of said seat supporting bracket at a predetermined interval from said seat supporting bracket, wherein an inner transverse end of said side sill reinforcing means is spaced from said floor panel reinforcing means by a predetermined distance in the transverse direction of the vehicle, so that said side sill reinforcing means reinforces a portion of the floor panel along the transverse direction of the vehicle, the portion of the floor panel reinforced by said side sill reinforcing means extending from each of the side sills to a position spaced outwardly from said floor panel reinforcing means by said predetermined distance in the transverse direction of the vehicle, thereby permitting the portion of the floor panel reinforced by said side sill reinforcing means and said side sill reinforcing means attached to said portion of the floor panel to undergo displacement toward a side wall surface of said floor panel reinforcing means and to abut against the side wall surface when subjected to a side collision impact force.

4. The lower body structure for a vehicle according to claim 3, wherein said side sill reinforcing means is arranged with respect to said floor panel reinforcing means to permit said side sill reinforcing means to be displaced via the floor panel toward the side wall surface of said floor panel reinforcing means and to abut against and be supported by the side wall surface of said floor panel reinforcing means at a position in a vicinity of a straight line passing through a center of a cross section of said floor panel reinforcing means and inclined toward a position below a transverse center of the vehicle.

5. The lower body structure for a vehicle according to claim 3, further comprising a lower seat supporting bracket disposed underneath said seat supporting bracket with a portion of the floor panel nipped between said seat supporting bracket and said lower seat supporting bracket.

6. The lower body structure for a vehicle according to claim 3, wherein said seat supporting bracket is connected to the side sill in a vicinity of a junction between the side sill and a center pillar.

7. The lower body structure for a vehicle according to claim 3, wherein said seat supporting bracket has a plate thickness T and said floor panel reinforcing means has a height H, wherein L represents said predetermined distance and is in the range:

$$3T \leq L \leq 3T+H.$$

8. The lower body structure for a vehicle according to claim 1, wherein said floor cross member contacts the floor panel along its entire transverse length.

* * * * *